United States Patent
Jung

(10) Patent No.: US 9,496,586 B1
(45) Date of Patent: Nov. 15, 2016

(54) APPARATUS AND METHOD FOR CONTROLLING POWER FOR SECONDARY BATTERY

(71) Applicant: LG CHEM, LTD., Seoul (KR)

(72) Inventor: Seung-Hun Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/906,968

(22) PCT Filed: Jul. 22, 2015

(86) PCT No.: PCT/KR2015/007639
§ 371 (c)(1),
(2) Date: Jan. 22, 2016

(87) PCT Pub. No.: WO2016/098980
PCT Pub. Date: Jun. 23, 2016

(30) Foreign Application Priority Data

Dec. 19, 2014 (KR) ........................ 10-2014-0184813

(51) Int. Cl.
H02J 7/00 (2006.01)
H01M 10/44 (2006.01)
H01M 10/42 (2006.01)

(52) U.S. Cl.
CPC ......... *H01M 10/443* (2013.01); *H01M 10/425* (2013.01); *H02J 7/007* (2013.01); *H02J 7/0063* (2013.01); *H01M 2010/4271* (2013.01); *H01M 2010/4278* (2013.01); *H01M 2220/20* (2013.01); *H01M 2220/30* (2013.01); *H02J 2007/0067* (2013.01)

(58) Field of Classification Search
CPC .................................................. H01M 10/443
USPC ................................................ 320/134–136
See application file for complete search history.

(56) References Cited

U.S. PATENT DOCUMENTS

| | | | |
|---|---|---|---|
| 6,225,788 B1 | 5/2001 | Kouzu et al. | |
| 7,622,896 B2 * | 11/2009 | Nakagawa | H02J 7/047 320/150 |
| 8,796,994 B2 * | 8/2014 | Abe | H01M 10/3909 320/126 |

(Continued)

FOREIGN PATENT DOCUMENTS

| | | |
|---|---|---|
| EP | 2 133 974 A1 | 12/2009 |
| JP | 11-111349 A | 4/1994 |

(Continued)

OTHER PUBLICATIONS

Written Opinion of the International Searching Authority, issued in PCT/KR2015/007639, mailed Oct. 27, 2015.

*Primary Examiner* — Richard V Muralidar
(74) *Attorney, Agent, or Firm* — Birch, Stewart, Kolasch & Birch, LLP

(57) ABSTRACT

A power control apparatus according to the present disclosure includes a sensing unit configured to measure a temperature of a battery cell, an outside air temperature around the battery cell and a load current, an adjusting unit configured to adjust power supplied from the battery cell to a load, and a control unit configured to estimate a future temperature change of the battery cell based on the temperature of the battery cell, the outside air temperature around the cell and the load current measured by the sensing unit, analyze the estimated future temperature change of the cell, and control the adjusting unit to reduce the power supplied from the battery cell to the load when the temperature of the battery cell is estimated to increase above a limit temperature for a preset reference time.

14 Claims, 3 Drawing Sheets

(56) References Cited

U.S. PATENT DOCUMENTS

| | | | |
|---|---|---|---|
| 8,854,009 B2* | 10/2014 | Benise | H01M 10/443 320/134 |
| 9,252,623 B2* | 2/2016 | Sim | H01M 10/443 |
| 2004/0104709 A1 | 6/2004 | Yamaji et al. | |
| 2006/0001405 A1* | 1/2006 | Nakagawa | H02J 7/047 320/150 |
| 2010/0033131 A1 | 2/2010 | Kim | |

FOREIGN PATENT DOCUMENTS

| | | |
|---|---|---|
| JP | 2009-278754 A | 11/2009 |
| JP | 2010-183822 A | 8/2010 |
| KR | 10-2007-0076833 A | 7/2007 |
| KR | 10-2010-0019819 A | 2/2010 |

* cited by examiner

APPARATUS AND METHOD FOR CONTROLLING POWER FOR SECONDARY BATTERY

TECHNICAL FIELD

The present application claims priority to Korean Patent Application No. 10-2014-0184813 filed in the Republic of Korea on Dec. 19, 2014, the disclosure of which is incorporated herein by reference.

The present disclosure relates to an apparatus and method for controlling power for a secondary battery, and more particularly, to an apparatus and method for controlling power whereby a future temperature of a secondary battery is estimated and an output of the secondary battery is selectively reduced according to a result of the estimation.

BACKGROUND ART

As opposed to a disposable primary battery, a secondary battery is referred to as a rechargeable battery, and has a wide range of applications including, for example, electronic devices, such as mobile phones, laptop computers and camcorders, or electric vehicles. Also, a secondary battery is being used as a source of power of automobiles because it does not cause air pollution and can be used for a long period of time.

However, a secondary battery has characteristics that the temperature rises due to the generation of heat from the battery during charging or discharging and the life reduces when exposed to high temperature for a long term.

According to such characteristics, a secondary battery pack mounted in a vehicle discharge heat generated from a battery using a separately mounted cooling system to maintain the temperature of the secondary battery below a predetermined temperature.

However, the method of additionally mounting the cooling system becomes a factor that causes the cost of the secondary battery pack to increase and has a problem with an increase in size of a battery system.

DISCLOSURE

Technical Problem

To solve the problem of the related art, the present disclosure is directed to providing an apparatus and method for controlling power for a secondary battery to protect the secondary battery from overheat through power control of the secondary battery without mounting a separate cooling system.

Further, the present disclosure is directed to providing an apparatus and method for controlling power for a secondary battery whereby a temperature change of a secondary battery is estimated and an overheat phenomenon of the secondary battery is prevented according to a result of the estimation.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the above objects, a power control apparatus according to one aspect of the present disclosure includes a sensing unit configured to measure a temperature of a battery cell, an outside air temperature around the battery cell and a load current, an adjusting unit configured to adjust power supplied from the battery cell to a load, and a control unit configured to estimate a future temperature change of the battery cell based on the temperature of the battery cell, the outside air temperature around the cell and the load current measured by the sensing unit, analyze the estimated future temperature change of the cell, and control the adjusting unit to reduce the power supplied from the battery cell to the load when the temperature of the battery cell is estimated to increase above a limit temperature for a preset reference time.

The control unit may estimate a future temperature change of the battery cell by using Equation 1.

The control unit may analyze the estimated future temperature change of the battery cell, when the future temperature of the battery cell is determined to converge, calculate a convergence time required for the temperature of the battery cell to converge by using Equation 1, and when the convergence temperature of the battery cell is higher than or equal to the limit temperature and the convergence time is less than or equal to the reference time, control the adjusting unit to reduce the power supplied from the battery cell to the load.

On the other hand, the control unit may fail to proceed with power derating of the battery cell when the convergence temperature of the battery cell is less than the limit temperature or the convergence time exceeds the reference time.

Also, the control unit may analyze the estimated future temperature change of the battery cell, when the future temperature of the battery cell is determined to diverge, calculate a reach time required for the battery cell to reach the limit temperature by using Equation 1, and when the calculated reach time is less than or equal to the reference time, control the adjusting unit to reduce the power supplied from the battery cell to the load.

The control unit may fail to proceed with power derating of the battery cell when the reach time exceeds the reference time.

The control unit may calculate a derating factor allowing the temperature of the battery cell to reach a predetermined level of the limit temperature for the reference time by using Equation 1, determine a power amount to reduce based on the derating factor, and controls the adjusting unit.

To achieve the above objects, a power control method according to another aspect of the present disclosure includes measuring a temperature of a battery cell, an outside air temperature around the battery cell and a load current, estimating a future temperature change of the battery cell based on the measured temperature of the battery cell, outside air temperature around the cell and load current, determining whether the temperature of the battery cell increases above a limit temperature for a preset reference time, by analyzing the estimated future temperature change of the battery cell, and reducing output power of the battery cell when the temperature of the battery cell is determined to increase above the limit temperature for the reference time as a result of the determination.

Advantageous Effects

The present disclosure has an advantage in that output of a secondary battery is controlled to maintain the temperature of the secondary battery below the range of a limit temperature before overheat of the secondary battery occurs, thereby preventing a phenomenon in which the life and performance of the secondary battery is degraded due to overheat.

Also, the present disclosure has an effect on the maintenance of the temperature of the secondary battery below the limit temperature without having a separate device such as a cooling system.

Further, the present disclosure has an effect on the accurate estimation of overheat of the secondary battery through a temperature estimation algorithm.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION FOR PRACTICING THE INVENTION

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
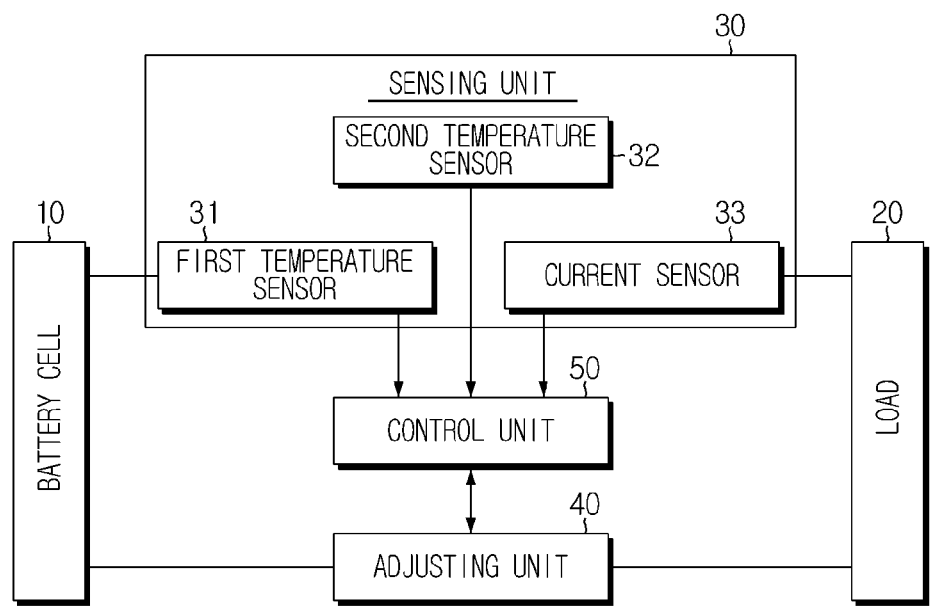
FIG. 1 is a diagram showing configuration of an apparatus for controlling power for a secondary battery according to an embodiment of the present disclosure.

FIG. 1 is a diagram showing configuration of an apparatus for controlling power for a secondary battery according to an embodiment of the present disclosure.

As shown in FIG. 1, the apparatus for controlling power for a secondary battery according to a preferred embodiment of the present disclosure includes a battery cell 10, a load 20, a sensing unit 30, an adjusting unit 40, and a control unit 50.

The battery cell 10 supplies power to the load 20. The battery cell 10 includes at least one cell, and is not limited to a particular type and includes rechargeable batteries, for example, lithium ion batteries, lithium metal batteries, lithium polymer batteries, nickel cadmium batteries, nickel hydrogen batteries, nickel zinc batteries and lead storage batteries.

The load 20 is not limited to a particular type, and includes portable electronic devices such as video cameras, mobile phones, portable PCs, PMPs and MP3 players, motors for electric vehicle or hybrid vehicle, and DC to DC converters.

The sensing unit 30 includes a first temperature sensor 31 to measure the temperature of the battery cell 10, a second temperature sensor 32 to measure the outside air temperature around the battery cell, and a current sensor 33 to measure an electric current of the load 20. The first temperature sensor 31 periodically measures the temperature of the battery cell 10 and transmits the same to the control unit 50. Also, the second temperature sensor 32 periodically measures the outside air temperature around the battery cell and transmits the same to the control unit 50. Also, the current sensor 33 periodically measures an electric current in the load 20 and transmits the same to the control unit 50.

The adjusting unit 40 adjusts the amount of the power supplied from the battery cell 10 to the load 20 under the control of the control unit 50. The adjusting unit 40 may include a variable element which changes the voltage level supplied from the battery cell 10, and the control unit 50 may control the power supply from the battery cell 10 by controlling the variable element included in the adjusting unit 40.

The control unit 50 estimates a temperature change of the battery cell 10 based on sensing data obtained from the sensing unit 30, determines whether to derate the power supply from the battery cell 10 based on the temperature change, and when power derating is determined, controls the adjusting unit 40 to derate the power supply from the battery cell 10. Specifically, the control unit 50 estimates a future temperature change of the battery cell 10 over time by substituting data sensed through the sensing unit 30 to the following Equation 1, and determines whether the future temperature of the battery cell 10 diverges or converges based on a temperature change trend.

$$m \cdot C_p \frac{dT}{dt} = ((1-k)I)^2 \cdot R_{cell} + \left( \frac{T_{environment} - T}{R_{th\_environment}} \right) \quad \text{(Equation 1)}$$

m: battery cell mass (kg)
$C_p$: specific heat of cell (J/kg·K)
T: cell temperature (° C.)
t: time
k: derating factor
I: current (A)
$R_{cell}$: internal cell resistance (Ω)
$T_{environment}$: outside air temperature around cell (° C.)
$R_{th\_environment}$: thermal resistance between cell and environment (K/W)

The Equation 1 is an energy balance equation, and the battery cell mass (m), the specific heat of cell ($C_p$), the internal cell resistance ($R_{cell}$), and the thermal resistance between cell and environment ($R_{th\_environment}$) may be preset. Also, the derating factor (k) is initially set to '0', and has a value of from '0' to '1'. On the other hand, the internal cell resistance ($R_{cell}$) may be also identified through a measured value. That is, the control unit 50 may also measure the current and voltage of the battery cell 10 using a sensor (not shown) which measures the current and voltage of the battery cell 10, and measure the internal cell resistance ($R_{cell}$) based on the measured current and voltage.

The control unit 50 identifies a temperature change (dT) of the battery cell 10 vs time change (dt) by substituting the temperature values and current values received from each of the first temperature sensor 31, the second temperature sensor 32, and the current sensor 33 to Equation 1, and estimates a future temperature change trend of the battery cell 10.

The control unit 50 determines whether the future temperature of the battery cell 10 diverges or converges by analyzing the estimated future temperature change trend.

When the future temperature of the battery cell 10 diverges, the control unit 50 calculates a limit temperature reach time ($\Delta t_{limit}$) required to reach a limit temperature ($T_{limit}$) preset using Equation 1. Further, when the limit temperature reach time ($\Delta t_{limit}$) exceeds a preset reference time ($\Delta t_{ref}$), the control unit 50 does not proceed with power derating of the battery cell 10. In contrast, when the limit temperature reach time ($\Delta t_{limit}$) is less than or equal to the reference time ($\Delta t_{ref}$), the control unit 50 calculates a derating factor (k) allowing the temperature of the battery cell 10 to only increase up to a predetermined level (e.g., 99%) of the limit temperature ($T_{limit}$) during the reference time ($\Delta t_{ref}$) and controls the adjusting unit 40 to derate the power supply from the battery cell 10 based on the derating factor (k). In this instance, the control unit 50 determines a power amount of the battery cell 10 to reduce, in proportion to the calculated dimension of the derating factor (k), and controls the adjusting unit 40 to deduct the determined power amount from the output power. For example, when the derating factor (k) is calculated as '0.9', the control unit 50 may control the adjusting unit 40 such that the output of the battery cell 10 is at the level of 10% as compared to the very previous batter cell output, and when the derating factor (k) is calculated as '0.8', the control unit 50 may control the adjusting unit 40 such that the output of the battery cell 10 is at the level of 20% as compared to the very previous batter cell output.

On the other hand, when the temperature of the battery cell 10 is estimated as converging, the control unit 50 calculates a convergence time ($\Delta t_{sat}$) required for the battery cell 10 to reach a convergence temperature ($T_{sat}$) by using Equation 1. Further, when the convergence temperature ($T_{sat}$) is higher than or equal to the preset limit temperature ($T_{limit}$), and the convergence time ($\Delta t_{sat}$) is less than or equal to the preset reference time ($\Delta t_{ref}$), the control unit 50 calculates a derating factor (k) allowing the convergence temperature ($T_{sat}$) to only reach as much as a predetermined level (e.g., 99%) of the limit temperature ($T_{limit}$) during the reference time ($\Delta t_{ref}$) through Equation 1, and controls the adjusting unit 40 to reduce the output of the battery cell 10 based on the derating factor (k). In contrast, when the convergence temperature ($T_{sat}$) is less than the limit temperature ($T_{limit}$) or the convergence time ($\Delta t_{sat}$) exceeds the reference time ($\Delta t_{ref}$), the control unit 50 does not proceed with power derating of the battery cell 10.

On the other hand, the control unit 50 may be implemented as a microprocessor which executes a code programmed to embody a method for controlling power for a secondary battery according to the present disclosure. Alternatively, the control unit 50 may be implemented as a semiconductor chip in which a control flow of a method for controlling power for a secondary battery according to the present disclosure is embodied as a logic circuit. However, the present disclosure is not limited thereto.

Also, the apparatus for controlling power for a secondary battery according to the present disclosure may be used in combination with a battery pack driving apparatus which receives power from the batter pack. For example, the present disclosure may be used in various types of electronic products which receive power from batteries, such as laptop computers, mobile phones, and personal mobile multimedia players. As another example, the present disclosure may be used in combination with various types of battery-powered devices such as electric vehicle, hybrid vehicle, and e-bike. Also, the apparatus for controlling power for a secondary battery according to the present disclosure may be used in a battery management system (BMS) which controls the charge/discharge of the battery pack and protects the battery pack from overcharge or overdischarge.

Figure 2:
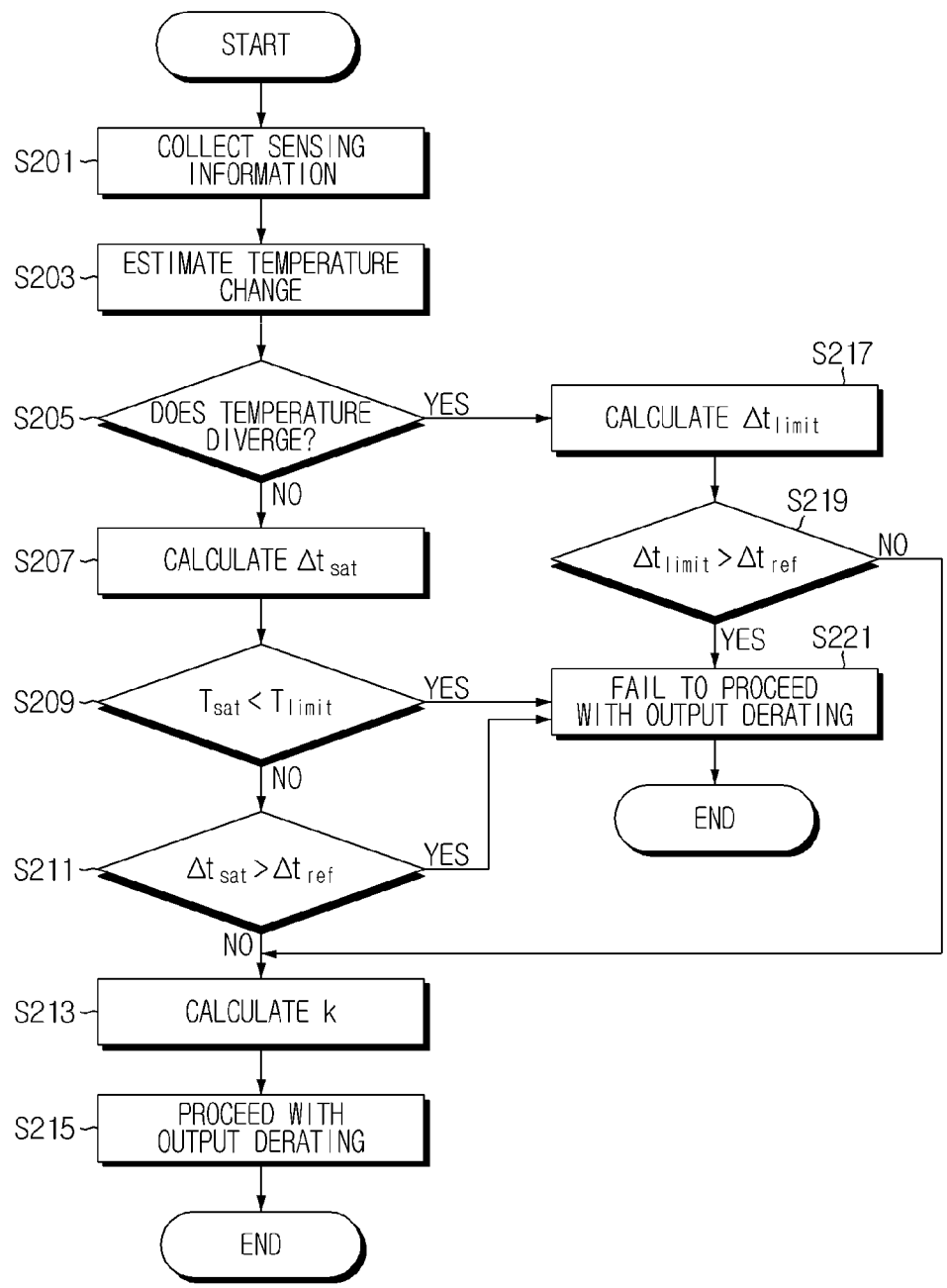
FIG. 2 is a schematic flowchart showing a method for controlling power for a secondary battery according to an embodiment of the present disclosure.

FIG. 2 is a schematic flowchart showing a method for controlling power for a secondary battery according to an embodiment of the present disclosure.

Referring to FIG. 2, the control unit 50 collects sensing information of the secondary battery at a predetermined cycle using the sensing unit 30 (S201). That is, the control unit 50 collects the temperature of the battery cell 10 using the first temperature sensor 31 of the sensing unit 30, the outside air temperature around the battery cell 10 using the second temperature sensor 32, and the electric current in the load 20 using the current sensor 33.

Subsequently, the control unit 50 estimates a future temperature change trend of the battery cell by substituting the collected sensing information (i.e., the battery cell temperature, the outside air temperature, and the load current) to Equation 1 (S203). Additionally, the control unit 50 identifies a temperature change (dT) of the battery cell 10 vs time change (dt) by substituting the battery cell temperature, the outside air temperature, and the current collected at the predetermined cycle through the sensing unit 30 to Equation 1, and estimates a future temperature change trend of the battery cell 10.

Subsequently, the control unit 50 determines whether the future temperature of the battery cell 10 converges on a particular temperature or continues to diverge by analyzing the estimated temperature change trend (S205).

Subsequently, when the future temperature of the battery cell 10 is determined to converge (NO at S205), the control unit 50 identifies a convergence temperature ($T_{sat}$) on which the battery cell 10 converges from the estimated future temperature change trend, and calculates a convergence time ($\Delta t_{sat}$) required to reach the convergence temperature ($T_{sat}$) by applying the convergence temperature ($T_{sat}$) to Equation 1 (S207). In this instance, the control unit 50 may substitute the sensing information (cell temperature, outside air temperature, and load current) identified at S201 to Equation 1, or may re-collect sensing information (cell temperature, outside air temperature, and load current) using the sensing unit 30 and substitute the re-collected sensing information to Equation 1. Also, the control unit 50 may measure the current and voltage of the battery cell 10 using a sensor (not shown) which measures the current and voltage of the battery cell 10, measure an internal cell resistance ($R_{cell}$) based on the measured current and voltage, and substitute the measured internal cell resistance ($R_{cell}$) to Equation 1.

Subsequently, the control unit 50 compares the convergence temperature ($T_{sat}$) to a preset limit temperature ($T_{limit}$) to determine whether the convergence temperature ($T_{sat}$) is less than the limit temperature ($T_{limit}$) (S209). Subsequently, when the convergence temperature ($T_{sat}$) is higher than or equal to the limit temperature ($T_{limit}$) (NO at S209), the control unit 50 compares the convergence time ($\Delta t_{sat}$) to a preset reference time ($\Delta t_{ref}$) to determine whether the convergence time ($\Delta t_{sat}$) exceeds the reference time ($\Delta t_{ref}$) (S211). Also, when the convergence time ($\Delta t_{sat}$) does not exceed the referenced time ($\Delta t_{ref}$) as a result of the determination (NO at S211), the control unit 50 calculates a derating factor (k) allowing the convergence temperature ($T_{sat}$) to only reach a predetermined level (e.g., 99%) of the limit temperature ($T_{limit}$) through Equation 1 to reduce the output power of the battery cell 10 (S213). In this instance, the control unit 50 calculates the derating factor (k) by applying the convergence time ($\Delta t_{sat}$) and the convergence temperature ($T_{sat}$) to Equation 1.

Subsequently, the control unit 50 determines a power amount to reduce, in proportion to the calculated derating factor (k) value, and controls the adjusting unit 40 to deduct a power amount as much as the power amount to reduce from the power supply, and finally to reduce the power supplied from the battery cell 10 to the load 20 (S215). That is, when the convergence temperature ($T_{sat}$) is higher than or equal to the limit temperature ($T_{limit}$) and the convergence time ($\Delta t_{sat}$) does not exceed the reference time ($\Delta t_{ref}$) as a result of determination at S209 and S211, the control unit 50 estimates that overheat above the limit temperature occurs within the reference time ($\Delta t_{ref}$), and controls the adjusting unit 40 based on the calculated derating factor (k) to reduce the output of the battery cell 10 beforehand, thereby preventing the battery cell 10 from overheating.

On the other hand, at S205, when the temperature of the battery cell 10 is determined to diverge (YES at S205), the control unit 50 calculates the time ($\Delta t_{limit}$) required for the temperature of the battery cell 10 to reach the preset limit temperature ($T_{limit}$) through Equation 1 (S217). That is, the control unit 50 calculates a time change (dt) by substituting the limit temperature ($T_{limit}$) to Equation 1, and calculates a limit temperature reach time ($\Delta t_{limit}$) required to reach the limit temperature based on the calculated time change (dt). In this instance, the control unit 50 may substitute the sensing information (cell temperature, outside air temperature, and load current) identified at S201 to Equation 1, or may re-collect sensing information (cell temperature, outside air temperature, and load current) using the sensing unit 30 and substitute the re-collected sensing information to Equation 1.

Subsequently, the control unit 50 identifies whether the calculated limit temperature reach time ($\Delta t_{limit}$) exceeds the preset reference time ($\Delta t_{ref}$) (S219), and when the limit temperature reach time does not exceed the reference time, calculates a derating factor (k) allowing the temperature from the battery cell 10 to only increase up to a predetermined level (e.g., 99%) of the limit temperature ($T_{limit}$) for the reference time ($\Delta t_{ref}$) through Equation 1 (S213). In this instance, the control unit 50 calculates the derating factor (k) by applying the limit temperature reach time ($\Delta t_{limit}$) and the limit temperature ($T_{limit}$) to Equation 1.

Subsequently, the control unit 50 determines a power amount to reduce, in proportion to the calculated derating factor (k) value, and controls the adjusting unit 40 to deduct a power amount as much as the power amount to reduce from the output power, and finally to reduce the power supplied from the battery cell 10 to the load 20 (S215).

On the other hand, when the convergence temperature ($T_{sat}$) is less than the preset limit temperature ($T_{limit}$) at S209, when the convergence time ($\Delta t_{sat}$) exceeds the reference time ($\Delta t_{ref}$) at S211, or when the limit temperature reach time ($\Delta t_{limit}$) exceeds the reference time ($\Delta t_{ref}$) at S219, the control unit 50 does not proceed with output power derating of the battery cell 10 (S221). In this instance, the derating factor (k) is continuously set as the previous value (i.e., 0).

FIG. 2 illustrates a process corresponding to one cycle, and the process according to FIG. 2 may be performed at a predetermined interval of time.

Figure 3:
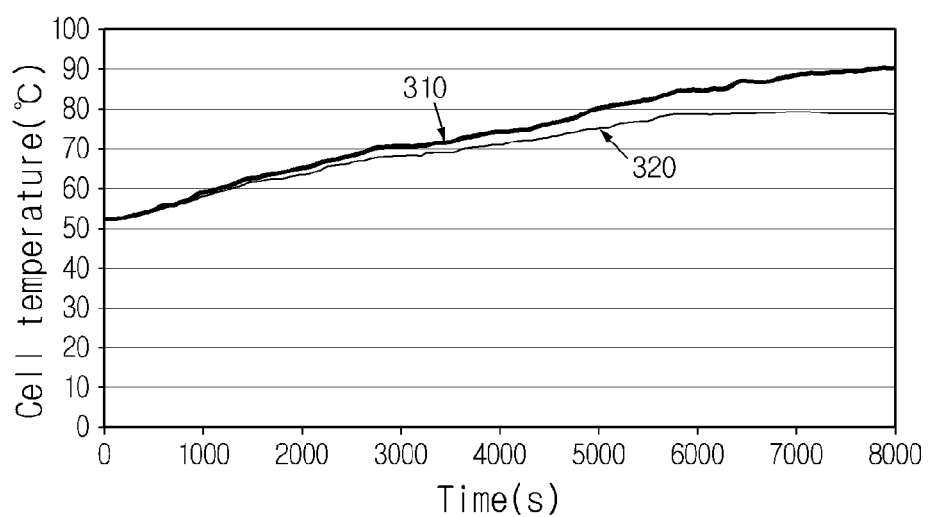
FIG. 3 is a graph of simulation showing a temperature change in a battery cell to which a method for controlling power according to the present disclosure is applied and a temperature change in a traditional battery cell.

FIG. 3 is a graph of simulation showing a temperature change in a battery cell to which the method for controlling power according to the present disclosure is applied and a temperature change in a traditional battery cell.

In the simulation according to FIG. 3, the initial cell temperature is set to 52° C., outside air temperature is set to 50° C., and the reference time ($\Delta_{ref}$) is set to 7,200 s.

Referring to FIG. 3, the reference numeral 310 in FIG. 3 indicates a graph showing a temperature change of a traditional battery cell, and it can be seen that the battery cell is overheated beyond the limit temperature (i.e., 80° C.). In contrast, the reference numeral 320 in FIG. 3 indicates a graph showing a temperature change in a battery cell to which the method for controlling power according to the present disclosure is applied, and it can be seen that the temperature of the battery cell is maintained less than the limit temperature (i.e., 80° C.) dissimilar to the traditional battery cell.

As described in the foregoing, the present disclosure controls the output of the battery cell 10 to maintain the temperature of the battery cell 10 below the limit temperature before overheat of the secondary battery occurs, thereby preventing a phenomenon in which the life and performance of the secondary battery is degraded due to overheat. Also, the present disclosure maintains the temperature of the secondary battery below a predetermined temperature without having a separate device such as a cooling system, thereby reducing the production cost of the battery pack. Further, the present disclosure accurately estimates overheat of the secondary battery through a temperature estimation algorithm, not experimental data.

While the present disclosure has been hereinabove described with respect to a limited number of embodiments and drawings, the present disclosure is not limited thereto, and various modifications and changes may be made by those skilled in the art within the technical aspect of the present disclosure and the scope of the appended claims and equivalents thereto.

What is claimed is:

1. A power control apparatus comprising:
   a sensing unit configured to measure a temperature of a battery cell, an outside air temperature around the battery cell and a load current;
   an adjusting unit configured to adjust power supplied from the battery cell to a load; and
   a control unit configured to estimate a future temperature change of the battery cell based on the temperature of the battery cell, the outside air temperature around the cell and the load current measured by the sensing unit, analyze the estimated future temperature change of the cell, and control the adjusting unit to reduce the power supplied from the battery cell to the load when the temperature of the battery cell is estimated to increase above a limit temperature for a preset reference time.

2. The power control apparatus according to claim 1, wherein the control unit estimates a future temperature change of the battery cell by using the following equation:

$$m \cdot C_p \frac{dT}{dt} = ((1-k)I)^2 \cdot R_{cell} + \left( \frac{T_{environment} - T}{R_{th\_environment}} \right) \quad \text{(Equation)}$$

m: battery cell mass (kg)
$C_p$: specific heat of cell (J/kg·K)
T: cell temperature (° C.)
t: time
k: derating factor
I: current (A)
$R_{cell}$: internal cell resistance (Ω)
$T_{environment}$: outside air temperature around cell (° C.)
$R_{th\_environment}$: thermal resistance between cell and environment (K/W).

3. The power control apparatus according to claim 2, wherein the control unit analyzes the estimated future temperature change of the battery cell, when the future temperature of the battery cell is determined to converge, calculates a convergence time required for the temperature of the battery cell to converge by using the equation, and when the convergence temperature of the battery cell is higher than or equal to the limit temperature and the convergence time is less than or equal to the reference time, controls the adjusting unit to reduce the power supplied from the battery cell to the load.

4. The power control apparatus according to claim 3, wherein the control unit fails to proceed with power derating of the battery cell when the convergence temperature of the battery cell is less than the limit temperature or the convergence time exceeds the reference time.

5. The power control apparatus according to claim 2, wherein the control unit analyzes the estimated future temperature change of the battery cell, when the future temperature of the battery cell is determined to diverge, calculates a reach time required for the battery cell to reach the limit temperature by using the equation, and when the calculated reach time is less than or equal to the reference time, controls the adjusting unit to reduce the power supplied from the battery cell to the load.

6. The power control apparatus according to claim 5, wherein the control unit fails to proceed with power derating of the battery cell when the reach time exceeds the reference time.

7. The power control apparatus according to claim 2, wherein the control unit calculates a derating factor allowing the temperature of the battery cell to reach a predetermined level of the limit temperature for the reference time by using the equation, determines a power amount to reduce based on the derating factor, and controls the adjusting unit.

8. A power control method comprising:
measuring a temperature of a battery cell, an outside air temperature around the battery cell and a load current;
estimating a future temperature change of the battery cell based on the measured temperature of the battery cell, outside air temperature around the cell and load current;
determining whether the temperature of the battery cell increases above a limit temperature for a preset reference time, by analyzing the estimated future temperature change of the battery cell; and
reducing output power of the battery cell when the temperature of the battery cell is determined to increase above the limit temperature for the reference time as a result of the determination.

9. The power control method according to claim 8, wherein the estimating comprises estimating a future temperature change of the battery cell by using the following equation:

$$m \cdot C_p \frac{dT}{dt} = ((1-k)I)^2 \cdot R_{cell} + \left( \frac{T_{environment} - T}{R_{th\_environment}} \right)$$ (Equation)

m: battery cell mass (kg)
$C_p$: specific heat of cell (J/kg·K)
T: cell temperature (° C.)
t: time
k: derating factor
I: current (A)
$R_{cell}$: internal cell resistance (Ω)
$T_{environment}$: outside air temperature around cell (° C.)
$R_{th\_environment}$: thermal resistance between cell and environment (K/W).

10. The power control method according to claim 9, wherein the determining comprises:
determining whether a future temperature of the battery cell converges or diverges based on the estimated future temperature change of the battery cell; and
calculating a convergence time required for the temperature of the battery cell to converge by using the equation when the future temperature of the battery cell is determined to converge, and
the reducing of output power comprises reducing the output power of the battery cell when the convergence temperature of the battery cell is higher than or equal to the limit temperature and the convergence time is less than or equal to the reference time.

11. The power control method according to claim 10, wherein the reducing of output power comprises failing to proceed with output power derating of the battery cell when the convergence temperature of the battery cell is less than the limit temperature or the convergence time exceeds the reference time.

12. The power control method according to claim 9, wherein the determining comprises:
determining whether a future temperature of the battery cell converges or diverges based on the estimated future temperature change of the battery cell; and
calculating a reach time required for the battery cell to reach the limit temperature by using the equation when the future temperature of the battery cell is determined to diverge, and
the reducing of output power comprises reducing the output power of the battery cell when the reach time is less than or equal to the reference time.

13. The power control method according to claim 12, wherein the reducing of output power comprises failing to proceed with output power derating of the battery cell when the reach time exceeds the reference time.

14. The power control method according to claim 9, wherein the reducing of output power comprises:
calculating a derating factor allowing the temperature of the battery cell to reach a predetermined level of the limit temperature for the reference time by using the equation; and
determining a power amount to reduce based on the calculated derating factor, and reducing the output power of the battery cell based on the determined power amount to reduce.

* * * * *